US012334633B2

(12) United States Patent
Smith et al.

(10) Patent No.: US 12,334,633 B2

(45) Date of Patent: Jun. 17, 2025

(54) COAXIAL STRUCTURE FOR ENABLING ELECTROMAGNETIC COMMUNICATIONS BETWEEN A CIRCUIT BOARD AND ANTENNA ARRAY

(71) Applicant: Optisys, Inc., Salt Lake City, UT (US)

(72) Inventors: Robert Smith, Salt Lake City, UT (US); Gregory Dunstan, Salt Lake City, UT (US)

(73) Assignee: Optisys, Inc., Salt Lake City, UT (US)

( * ) Notice: Subject to any disclaimer, the term of this patent is extended or adjusted under 35 U.S.C. 154(b) by 252 days.

(21) Appl. No.: 18/304,293

(22) Filed: Apr. 20, 2023

(65) Prior Publication Data

US 2023/0387586 A1 Nov. 30, 2023

Related U.S. Application Data

(60) Provisional application No. 63/363,304, filed on Apr. 20, 2022.

(51) Int. Cl.

| | |
|---|---|
| ***H01Q 1/50*** | (2006.01) |
| ***H01R 12/71*** | (2011.01) |
| ***H01R 13/24*** | (2006.01) |
| ***H01R 43/16*** | (2006.01) |

(52) U.S. Cl.

CPC ............. *H01Q 1/50* (2013.01); *H01R 12/714* (2013.01); *H01R 13/24* (2013.01); *H01R 43/16* (2013.01); *H01R 2201/02* (2013.01)

(58) Field of Classification Search

CPC ........ H01Q 1/50; H01R 12/714; H01R 13/24; H01R 43/16; H01R 2201/02; H01R 13/2492; H01R 24/50

See application file for complete search history.

(56) References Cited

U.S. PATENT DOCUMENTS

| | | | | |
|---|---|---|---|---|
| 5,380,211 | A * | 1/1995 | Kawaguchi | H01R 24/50 439/700 |
| 7,118,383 | B2 * | 10/2006 | Nagata | H01R 12/52 439/63 |
| 9,525,220 | B1 * | 12/2016 | Burris | H01R 13/6593 |

FOREIGN PATENT DOCUMENTS

| | | | |
|---|---|---|---|
| EP | 4047748 B1 * | 12/2024 | H01Q 1/1207 |

* cited by examiner

*Primary Examiner* — Seung H Lee

(74) *Attorney, Agent, or Firm* — TechLaw Ventures, PLLC; Terrence J. Edwards

(57) ABSTRACT

Electrical connectors and means for facilitating electromagnetic communication between an antenna array and a circuit board. A system includes a circuit board comprising an electrically conductive pad, a coaxial pin, and a spring pin configured to be disposed around at least a portion of the coaxial pin. The spring pin enables the coaxial pin to maintain an electrical connection with the electrically conductive pad of the circuit board.

20 Claims, 9 Drawing Sheets

COAXIAL STRUCTURE FOR ENABLING ELECTROMAGNETIC COMMUNICATIONS BETWEEN A CIRCUIT BOARD AND ANTENNA ARRAY

TECHNICAL FIELD

The disclosure relates generally to systems, methods, and devices related to electrical contacts and specifically to coaxial components.

BACKGROUND

Maintaining electrical connections with a circuit board is essential for the proper functioning and longevity of electronic devices. Poor electrical connections can lead to intermittent operation, malfunctioning, and even complete failure of a system. If electrical connections are not maintained, then it can be difficult or impossible to ensure proper signal transmission, maintain power delivery, prevent overheating, and ensure longevity of the system.

The above remains true when electromagnetic waves are propagated between a circuit board and another component. Antenna arrays, for example, are configured to receive, transmit, and propagate electromagnetic waves, which include radio waves. Sometimes these electromagnetic waves must further be propagated through coaxial pins and then to circuit boards or other electrical components. It is important to ensure these electromagnetic waves can successfully propagate between antenna arrays and circuit boards.

Maintaining connections between a component and a circuit board can be particularly challenging when the circuit board is manufactured with some geometric irregularities, such as a surface of the circuit board comprises indentation or deformations. Additionally, this can be challenging when the system experiences mechanical stressors such as sudden movements or vibrations. If the electrical connection between the component and the circuit board is disrupted, then the circuit board may no longer pass signals, electromagnetic energy, or instructions to the component. This typically causes failures or disruptions in system performance and should be avoided.

In view of the foregoing, described herein are systems, methods, and devices for maintaining electrical contacts with a circuit board. The systems, methods, and devices described herein may specifically be implemented within an antenna system to enable electrical and electromagnetic communication between a circuit board and an antenna array.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood regarding the following description and accompanying drawings where.

DETAILED DESCRIPTION

Figure 1A:
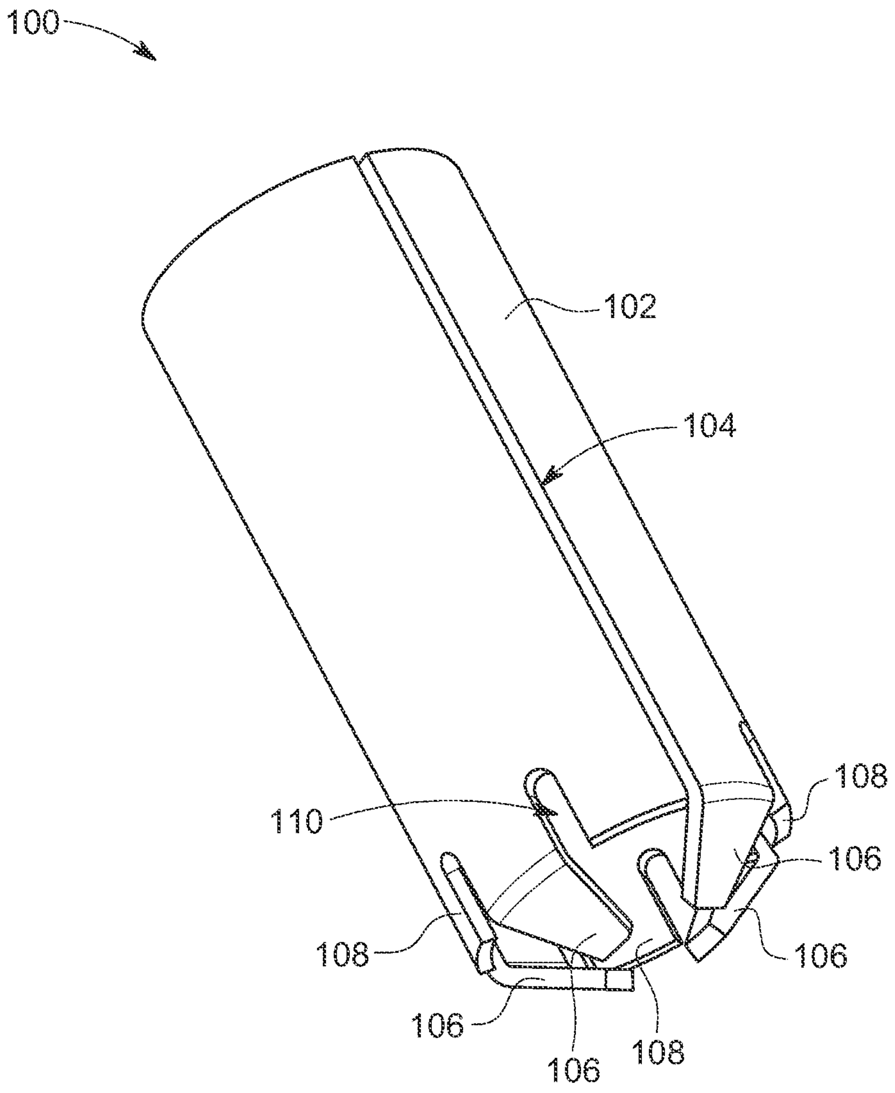
FIG. 1A illustrates a perspective view of a spring pin configured to be disposed within a coaxial structure of an antenna array.

Disclosed herein are improved systems, methods, and devices for electrical and electromagnetic connections. The systems and devices described herein may specifically be implemented to facilitate communication of electromagnetic waves between an antenna array and a circuit board. Specifically disclosed herein is a system comprising a coaxial structure and a spring pin configured to facilitate electromagnetic communications between the coaxial structure and a printed circuit board. The system includes a coaxial pin disposed within an antenna array, wherein the spring pin is configured to be disposed around an exterior surface of the coaxial pin to electrically communicate with the coaxial pin. The spring pin comprises a plurality of compliant fingers for forming a blind-mate connection with the printed circuit board to facilitate electromagnetic communications between the printed circuit board and the antenna array.

Electronically scanned antenna arrays consist of multiple antenna elements connected to individual electronic control channels to provide signals with appropriate phase and amplitude to the antenna element. These arrays can consist of tens to thousands of individual antenna elements, each individually fed with an independent electronic control channel. When the radiating element is fabricated from a different material than the electronics Circuit Card Assembly (CCA) then a connection must be facilitated between each of the antenna elements and the surface of the Printed Circuit Board (PCB) that comprises the foundation of the CCA. In some conventional systems, an antenna array communicates with a circuit board by way of at least two independent connectors, wherein one connector is attached to the antenna array and another connector is attached to the circuit board. Alternative connections include separate interposer materials or coaxial connections with compliant mesh conductive materials. These conventional systems are costly and prone to breaking. For example, one antenna array may comprise tens of thousands of connection points, wherein the antenna array must make electrical contact with a circuit board. In conventional systems, each one of these connection points requires a first connector attached to the antenna array and a second connector attached to the circuit board. Alternatively, each connection point requires a separate expensive interposer connection. These connectors are costly to manufacture and significantly drive up the manufacturing cost for the antenna array. Connectors are also less reliable. Connectors can also drive the electrical design of the PCB to non-optimal solutions for RF performance. Disclosed herein are elegant, cost effective, and reliable solutions to the deficiencies known in conventional systems.

The coaxial contacts described herein are configured to facilitate electromagnetic communications between an antenna array and a circuit board such as a printed circuit board (PCB). The printed circuit board supports one or more chips that communicate information and provide instructions to steer the beam generated by the antenna array. The systems, methods, and devices described herein include improved and cost-efficient coaxial contacts for enabling electronic communications between a printed circuit board and an antenna array.

The antenna arrays described herein comprise a plurality of radiating elements for transmitting and/or receiving electromagnetic signals. The radiating elements and other components within the antenna array are manufactured using metal additive manufacturing techniques to generate complex arrays comprising waveguides for propagating electromagnetic signals. Metal additive manufacturing (also known as three-dimensional printing) is a process of creating metal parts by adding successive layers of metal material until the desired shape is achieved. This process allows for the creation of complex geometries that are difficult or impossible to achieve with traditional manufacturing techniques.

The coaxial contacts described herein may be installed within the antenna array to feed into a radiating element of the antenna array and facilitate electromagnetic communications between the antenna array and a printed circuit board. The coaxial contacts described herein may be separately manufactured using metal additive manufacturing and/or metal stamping techniques, and then installed within the antenna array.

The printed circuit board and coaxial contact may be implemented in connection with a phased array (i.e., an electronically scanned array). The phased array is controlled by the one or more chips on the printed circuit board. The phased array transmits and/or receives electromagnetic signals and may be electronically steered to point in different directions without moving the antenna components.

Additionally, the printed circuit board and coaxial contact may be implemented in connection with a passive array (i.e., no electronic scanning). The passive array can be mechanically steered to point in different directions to steer the transmission or reception of electromagnetic signals. The antenna elements associated with the passive phased array are connected to a single transmitter and/or receiver.

In an implementation, the printed circuit board and coaxial contact are implemented in connection with a two-axis electronically scanned array. The two-axis array comprises two orthogonal electrical axes and is configured to transmit and receive orthogonal electromagnetic signals (i.e., Horizontal and Vertical, or Right-Hand Circular and Left-Hand Circular polarizations).

In the following description, for purposes of explanation and not limitation, specific techniques and embodiments are set forth, such as particular techniques and configurations, to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to embodiments are not restricted to only those embodiments in which they are described. For example, an element described in reference to one embodiment or figure, may be alternatively included in another embodiment or figure regardless of whether those elements are shown or described in another embodiment or figure. In other words, elements in the figures may be interchangeable between various embodiments disclosed herein, whether shown or not.

Before the structure, systems, and methods for coaxial contacts are disclosed and described, it is to be understood that this disclosure is not limited to the structures, configurations, process steps, and materials disclosed herein as such structures, configurations, process steps, and materials may vary somewhat. It is also to be understood that the terminology employed herein is used for the purpose of describing embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

For the purposes of this description as it relates to metal additive manufacturing, the direction of growth over time is called the positive z-axis, or "zenith" while the opposite direction is the negative z-axis or "nadir." The nadir direction is sometimes referred to as "downward" although the orientation of the z-axis relative to gravity makes no difference in the context of this invention. The direction of a surface at any given point is denoted by a vector that is normal to that surface at that point. The angle between that vector and the negative z-axis is the "overhang angle," $\theta$ ("theta").

The term "downward facing surface" is any non-vertical surface of an object being fabricated in a metal additive manufacturing process that has an overhang angle, $\theta$, measured between two vectors originating from any single point on the surface. The two vectors are: (1) a vector perpendicular to the surface and pointing into the air volume and (2) a vector pointing in the nadir (negative z-axis, opposite of the build, or zenith) direction. An overhang angle, $\theta$, for a downward facing surface will generally fall within the range: $0° < \theta < 90°$. Overhang angles, $\theta$, for downward facing surfaces are illustrated in various embodiments of hollow metal waveguides, as further described below. As used herein, downward facing surfaces are unsupported by removable support structures from within a waveguide during fabrication, for example, which means that no internal bracing exists within a cavity of a waveguide for supporting downward facing surfaces or build walls.

Figure 1B:
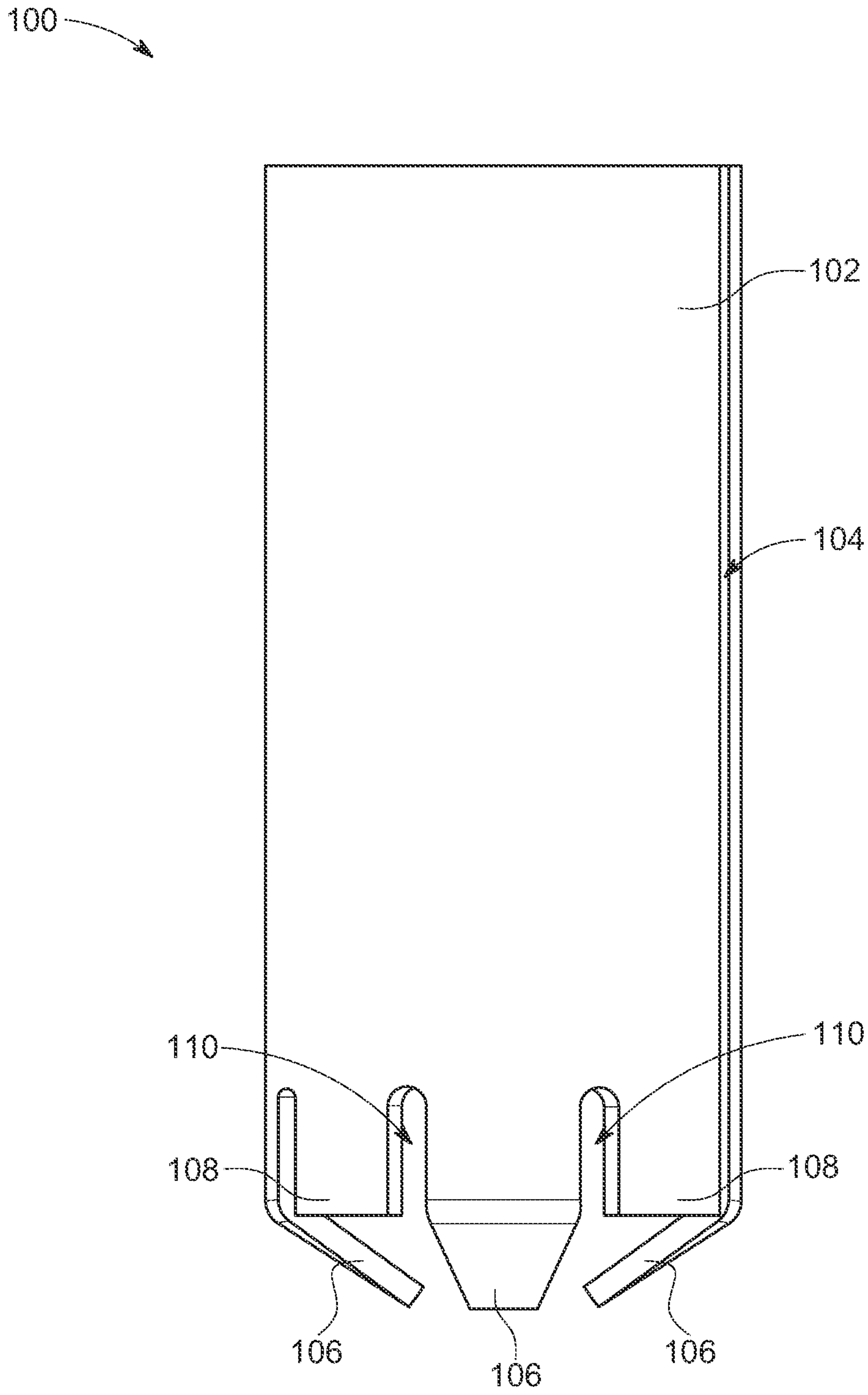
FIG. 1B illustrates a straight-on side view of a spring pin configured to be disposed within a coaxial structure of an antenna array.
Figure 1C:
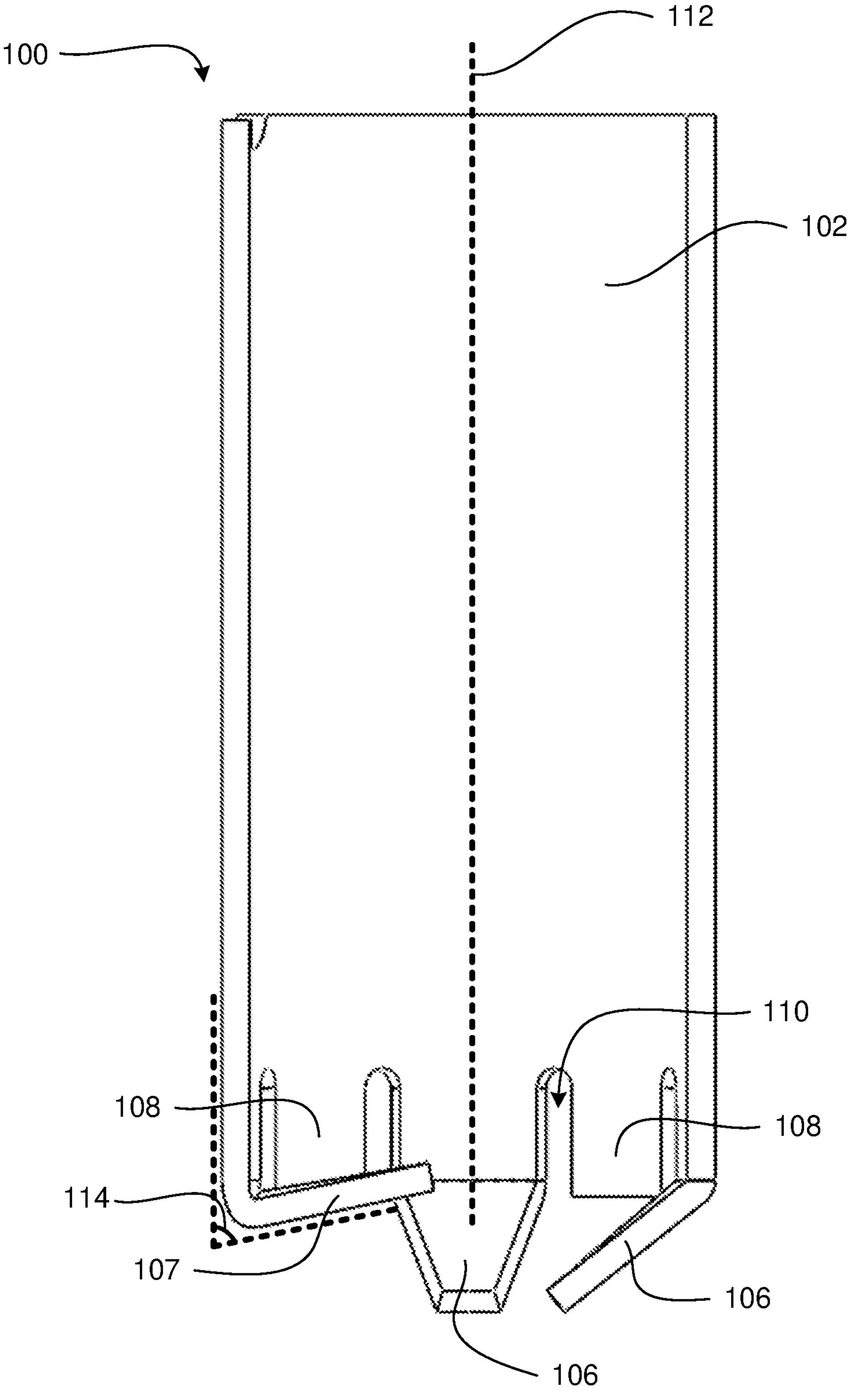
FIG. 1C illustrates a straight-on side view of a spring pin configured to be disposed within a coaxial structure of an antenna array.

Referring now to the figures, FIGS. 1A-1C illustrate a spring pin 100. FIG. 1A illustrates a perspective view of the spring pin 100 and FIG. 1B illustrates a straight-on side view of the spring pin 100. FIG. 1C illustrates a straight-on side view of the spring pin 100, wherein one of the spring pin fingers is bent to prevent the spring pin 100 from sliding up a corresponding coaxial pin. The spring pin 100 is a component of a coaxial contact for facilitating electromagnetic communication between an antenna array and a printed circuit board. The spring pin 100 is electrically conductive and is configured to encase a coaxial pin. The coaxial pin may be manufactured as an integrated component of the antenna array such that the coaxial pin is an indivisible component of the antenna array. The spring pin 100 is separately manufactured and may later be installed into the antenna array to encase the coaxial pin.

The antenna array may be manufactured using metal additive manufacturing techniques (three-dimensional printing). The coaxial pin may be oriented normal to a side of the antenna array, and this side may have a planar (flat) or nearly planar surface. However, the printed circuit board will not be planar or nearly planar, and at least not to the same extent as the antenna array. The printed circuit board undergoes a complex manufacturing processing comprising numerous lamination and compression processes. This manufacturing process results in a printed circuit board that comprises warps and twists and is not reliably planar. This introduces numerous challenges and reduces the likelihood that the printed circuit board will successfully communicate with the coaxial pin of the antenna array. The spring pin 100 overcomes these challenges by implementing one or more compliant fingers to bridge the gap between the planar (or nearly planar) surface of the antenna array and the non-planar surface of the printed circuit board.

The coaxial pin (a component of an antenna array) is oriented normal to the printed circuit board. The coaxial pin and the spring pin 100 are each manufactured of a conductive material. The spring pin 100 forms a blind-mate connection against the printed circuit board. This blind-mate connection enables the spring pin 100 to contact the printed circuit board even where the printed circuit board is warped or twisted. The physical contact between the spring pin 100 and the printed circuit board enables the electromagnetic communication between the printed circuit board and the antenna array.

The spring pin 100 includes a hollow casing 102 that is configured to encase the coaxial pin. The spring pin 100 includes a casing cutout 104, which may be a natural consequence of manufacturing the spring pin 100 using stamped manufacturing techniques and then curling the stamped (flat) metal piece into the cylindrical geometry illustrated in FIGS. 1A and 1B. Metal stamping is a manufacturing process used to create metal parts from sheet metal. There are several metal stamping techniques that may be used to manufacture the spring pin 100. The spring pin 100 may be manufacturing using one or more of blanking, which involves cutting a flat piece of sheet metal into a specific shape or size. The metal may be cut by a punch and die set designed to create the shape of the spring pin 100. The flat spring pin 100 may then be drawn to create its cylindrical shape by pulling the metal through a die to create the desired shape.

The casing cutout 104 enables the spring pin 100 to be easily compressed and stretched during installation into the antenna array. Additionally, the spring pin 100 has a compliant diameter and geometry because it is manufactured out of a thin sheet of metal. This enables the spring pin 100 to be tightly wrapped around a coaxial structure that may have a changing diameter along its length.

The spring pin 100 further includes a plurality of compliant fingers 106 that extend outward relative to the hollow casing 102. The compliant fingers 106 may be bent inward (or outward) and enable the spring pin 100 to form the blind-mate connection with the printed circuit board. The spring pin 100 further includes a plurality of finger channels 110 that are cut into the wall of the hollowing casing 102 and define a space between a compliant finger 106 and a casing edge 108.

The casing edges 108 are independent of another and define one edge of the cylindrical hollow casing 102. As shown in FIGS. 1A and 1B, the compliant fingers 106 comprise a longer length relative to the casing edges 108 and are bent inward relative to the wall of the hollow casing 102. Each of the casing edges 108 and the compliant fingers 106 could be bent inward or outward relative to the wall of the hollow casing 102, but the casing edges 108 are intended to remain straight relative to the wall of the hollowing casing 102. The compliant fingers 106 can extend inward toward a center point of the hollow casing 102 without touching each other or any other metal component of the spring pin 100. This is made possible by the shorter length of the casing edges 108 that provide additional space within the center region of the hollowing casing 102.

It is desirable to ensure that the compliant fingers 106 do not contact one another or any other component of the spring pin 100. If two or more compliant fingers 106 contact one another, this would cause reduced movement in the fingers. Therefore, the dimensions and geometry of the spring pin 100 are optimized to ensure that the compliant fingers 106 do not contact one another or any other component of the spring pin 100.

FIG. 1C illustrates a straight-on side view of the spring pin 100, wherein at least one of the fingers 106 is bent inward to create a bent finger 107. The bent finger 107 is bent inward toward a centerline 112 of the spring pin 100. The bent finger 107 may be bent sufficiently to prevent the spring pin 100 from sliding up a coaxial pin as described herein. Specifically, the bent finger 107 is configured to hook onto an edge of a coaxial pin and thus prevent the spring pin 100 from sliding further up the coaxial pin and away from a printed circuit board (PCB) (see, e.g., configurations illustrated in FIGS. 3, 6, and 7). The bent finger 107 helps ensure the spring pin 100 remains in contact with the PCB and continues to facilitate communication of an electromagnetic wave between the PCB and the coaxial pin.

In the example illustrated in FIG. 1C, the bent finger 107 is bent with an interior angle 114 of about 80°. As shown, the interior angle 114 is measured relative to the length of the body of the spring pin 100 and the length of the bent finger 107. In various embodiments, the interior angle 114 of the bent finger 107 may be from about 100° to about 45°. In certain embodiments, the bent finger 107 is bent with an interior angle 114 of about 45°, 50°, 55°, 60°, 65°, 70°, 75°, 85°, 90°, 95°, or 100°.

Any number of the compliant fingers 106 may be further bent to constitute a "bent finger" 107 as shown in FIG. 1C. In some embodiments, each of the compliant fingers 106 is bent to hook onto an edge of the coaxial pin and thus prevent the spring pin 100 from sliding up the coaxial pin. In other embodiments, only one of the compliant fingers 106 is further bent as shown in FIG. 1C. It should be appreciated that any number of the compliant fingers 106 may be further bent to prevent movement of the spring pin 100.

In typical implementations, a standard compliant finger 106 has an interior angle from about 115° to about 150° relative to the body of the spring pin 100. Further, the bent finger 107 may have the interior angle 114 from about 100° to about 45°. It should be understood that the angle ranges provided herein are exemplary only, and that the compliant fingers 106, 107 may be bent to have any suitable angle due to their compliancy. Additionally, it should be understood that the interior angles of each of the compliant fingers 106, 107 may naturally adjust when the spring pin 100 is depressed against the printed circuit board as described herein.

Figure 2:
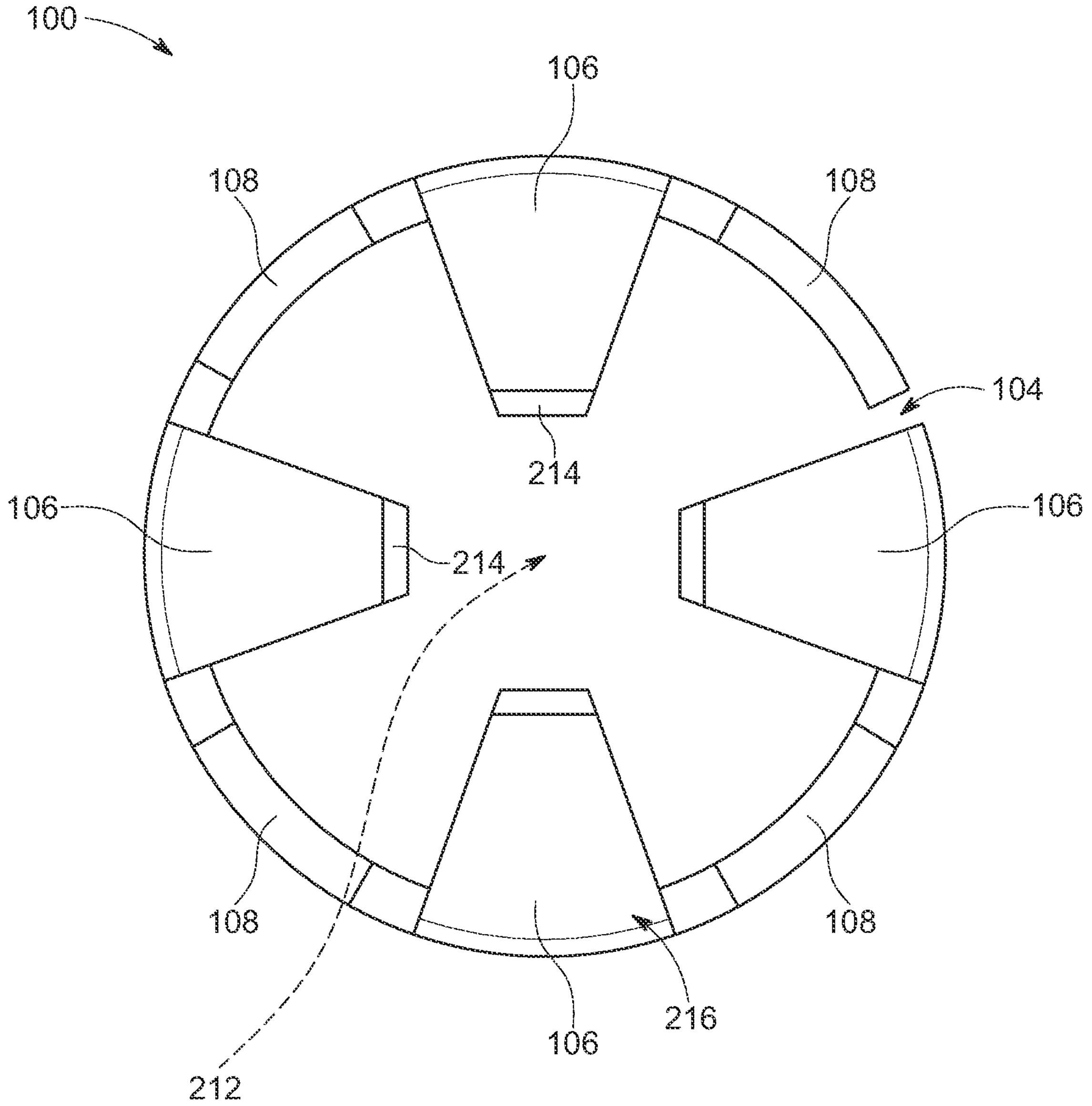
FIG. 2 is a straight view of one end of a spring pin that is configured to be disposed within a coaxial structure of an antenna array.

FIG. 2 is a straight view of a printed circuit board end (PCB end) of the spring pin 100. The printed circuit board-end of the spring pin 100 is the end configured to contact a printed circuit board. In an implementation, this end of the spring pin 100 is located at the negative z-axis location of the antenna array, relative to a metal additive manufacturing build direction for the antenna array.

The view in FIG. 2 illustrates that the compliant fingers 106 bend inward toward a center point 212 of the hollow casing 102. In an implementation, the printed circuit board comprises a conductive contact point located at least partially at the center point 212 of the spring pin 100. The conductive contact point on the printed circuit board may comprise a geometry and dimensions equal to or larger than the dimensions of the interior space defined by the hollowing casing 102.

The compliant fingers 106 each comprise a contact point 214 that is configured to make physical contact with a conductive element on the printed circuit board. As shown in FIG. 2, the contact point 214 may be defined by a bend in the stamped metal sheet of the compliant finger 106. In an embodiment, the compliant finger comprises a first bend point 216 located at or near the wall of the hollowing casing 102. The first bend point 216 is configured to bend the compliant finger 106 inward toward the center point 212. This ensures that the contact point 214 will make a stable contact with the printed circuit board to facilitate reliable electromagnetic communications between the antenna array and the printed circuit board.

Figure 3:
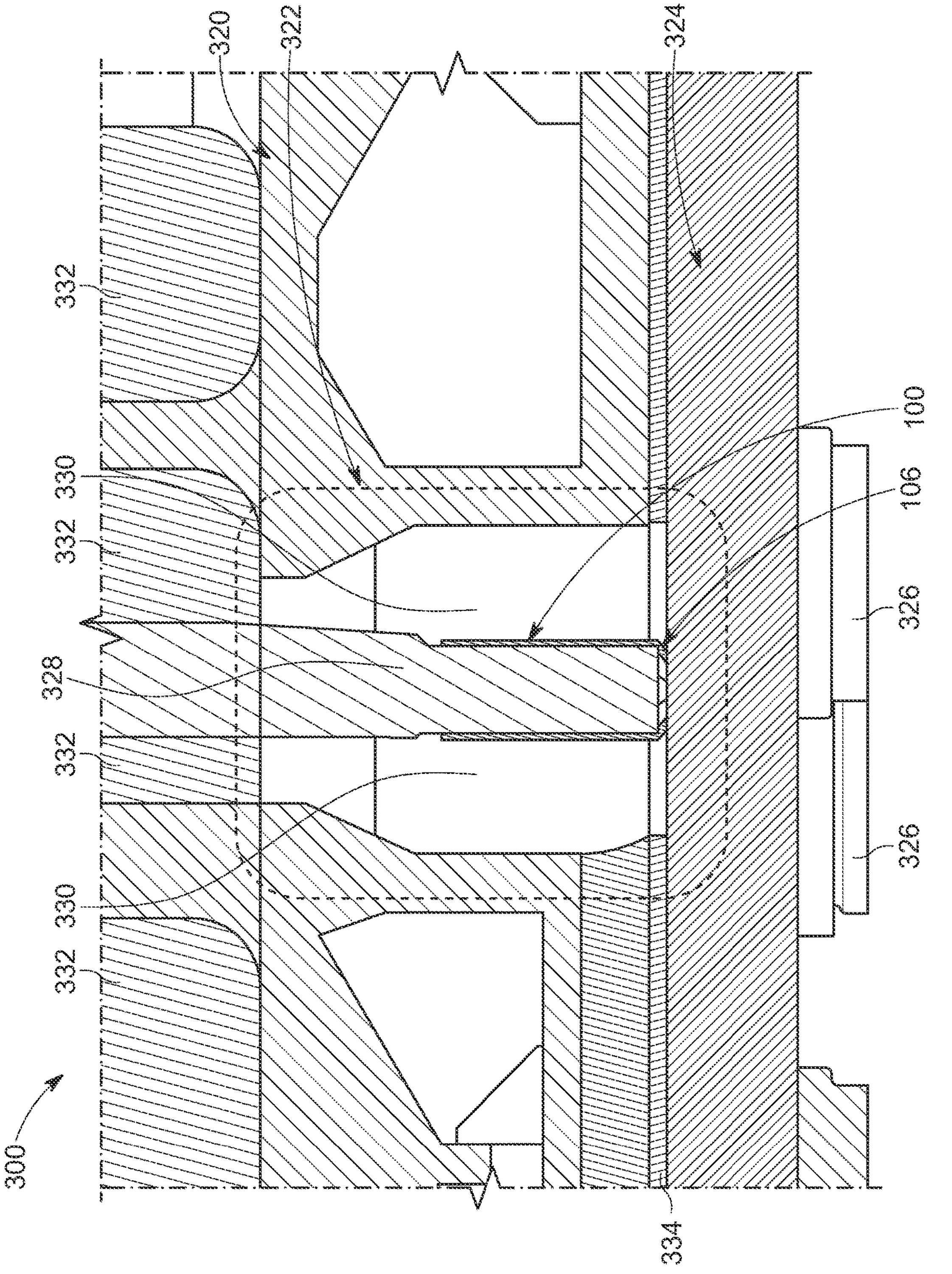
FIG. 3 is a cross-sectional side view of a system comprising a printed circuit board and an antenna array with a coaxial structure.

FIG. 3 is a cross-sectional side view of a system 300 illustrating a portion of an antenna array 320 communicating with a printed circuit board 324. FIG. 3 specifically illustrates a cross-sectional side view of a coaxial structure 322 (illustrated within the box defined by the dotted line) within the antenna array 320. The coaxial structure 322 comprises a coaxial pin 328. The spring pin 100 is disposed around the coaxial pin 328 such that the coaxial pin 328 contacts the spring pin 100 and electric signals can propagate along the combined coaxial pin 328 and the spring pin 100. When the spring pin 100 encases the coaxial pin 328, the spring pin 100 can readily electrically communicate with one another such that the spring pin 100 becomes a component of the coaxial pin for the antenna array 320.

The system 300 includes a coaxial air pocket 330 on either side of the coaxial pin 328. The coaxial air pocket 330 may be filled with a dielectric material. The coaxial pin 328 does not contact the ground plane at the coaxial air pocket 330, and instead the outer sides of the spring pin 100 are located adjacent to the air and/or dielectric material disposed within the coaxial air pocket 330.

The system 300 includes the printed circuit board 324. The compliant fingers 106 of the spring pin 100 contact the printed circuit board 324 as illustrated in FIG. 3. The system 300 further comprises a conductive compliant interposer 334 disposed between the antenna array and the printed circuit board 324. The conductive compliant interposer 334 allows for a continuous electrical connection around the coaxial outer conductor and the PCB to ensure electrical contact between the ground plane of the array and the ground plane of the PCB. The antenna array includes a plurality of CCA components 326, which can be comprised of beamforming chips, amplifiers, coaxial connectors, or many other surface mounted components necessary for array function.

The spring pin 100 may be manufactured using metal stamping manufacturing techniques. The planar geometry of the spring pin 100 may be stamped (i.e., cut) out of a thin sheet of metal and then rolled into the cylindrical geometry illustrated in FIGS. 1A-2. The spring pin 100 is then slid into the antenna array 320 around an exterior surface of the coaxial pin 328. This enables the tip of the coaxial pin 328 to form a blind-mate connection with an electrically conductive pad disposed on the printed circuit board 324. The coaxial pin 328 and spring pin 100 are oriented normal to the printed circuit board 324.

The spring pin 100 may be used in connection with an antenna array 320 that is manufactured using metal additive (three-dimensional printing) manufacturing techniques. The antenna array 320 may specifically be manufactured out of aluminum, and the spring pin 100 may similarly be manufactured out of an electrically conductive material. The antenna array 320 inherently does not comprise any significant spring or bending characteristics, and therefore, it is difficult to ensure the coaxial pin 328 can reliably interface with the printed circuit board 324 without the spring pin 100. The spring pin 100 is constructed of a spring material (i.e., a thin sheet of metal that can readily bend) and can slide around the coaxial pin 328 in a non-intrusive fashion to facilitate the electromagnetic communication between the antenna array 320 and the printed circuit board 324.

The spring pin 100 may specifically be manufactured of an electrically conductive material that comprises bending properties, such as beryllium copper. The compliant fingers 106 of the spring pin 100 can bend and deform to make a repeatable blind-mate contact against the electrically conductive pad on the printed circuit board 324. This obviates the need to solder any other components to the antenna array 320 and/or the printed circuit board 324 to ensure that the antenna array 320 can reliably electrically communicate with the printed circuit board 324.

The antenna array 320 may be manufactured as a single indivisible metal element using metal additive manufacturing techniques. These metal additive manufacturing techniques enable the coaxial pin 328 to be constructed as a single component of the antenna array 320. The coaxial pin 328 needs to contact the printed circuit board 324 in a low-loss manner to ensure the antenna array 320 receives communication from the printed circuit board 324. Conventional pin-and-socket configurations require bulky springs and sockets that negatively impact the performance of the coaxial structure 322. The systems, methods, and devices described herein enable the coaxial structure 322 to interface directly with pads on the printed circuit board 324 without the need for any other socket or pin to be soldered to the printed circuit board 324. This saved cost enables the pads on the printed circuit board 324 to be much smaller than they otherwise would be in conventional systems, and this further contributes to improved performance for the antenna array 320.

The antenna array 320 may include any suitable antenna array, including a passive array or electronically scanned array using any coaxially fed antenna structure. The antenna array 320 includes specialized metal structures that form negative air space 332 wherein an electromagnetic signal may propagate through the antenna array 320. The coaxial air pocket 330 of the coaxial structure may feed directly into (or out of) air space 332 of the antenna array 320 as shown in FIG. 3.

The system 300 illustrated in FIG. 3 may be replicated numerous times across the antenna array 320. In various implementations, the antenna array 320 may comprise hundreds, thousands, or tens-of-thousands of radiating elements that each require a coaxial structure 322. The spring pin 100 described herein significantly reduces the cost of facilitating electromagnetic communications between the printed circuit board 324 and the coaxial structure 322.

Figure 4:
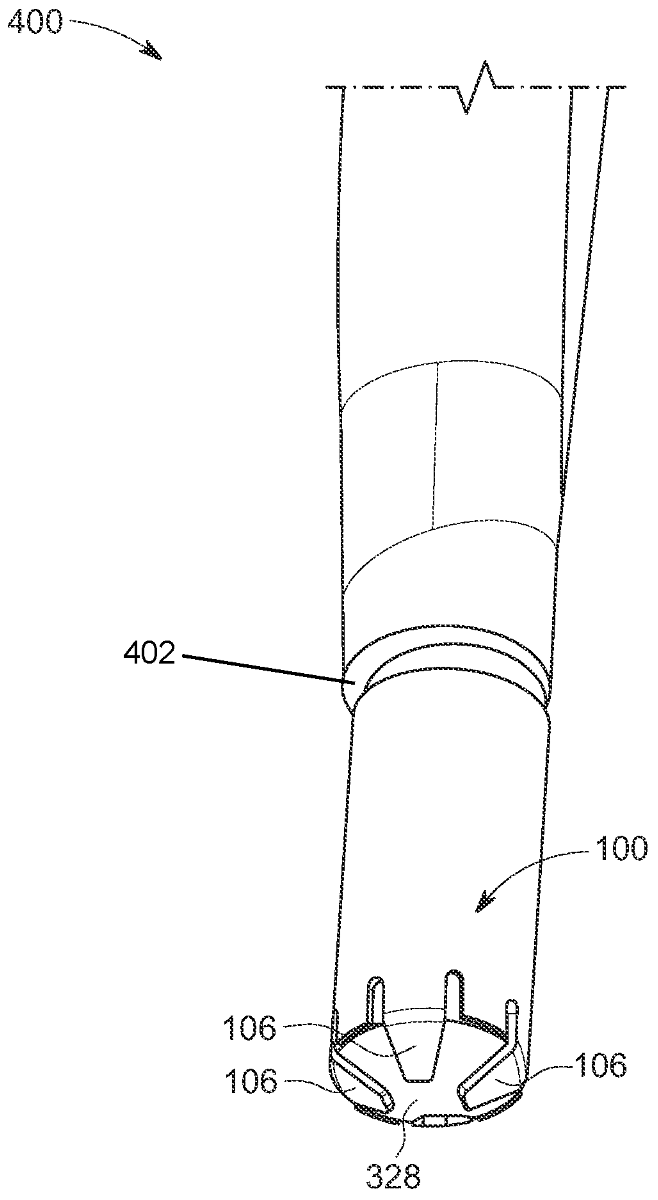
FIG. 4 illustrates a perspective view of an apparatus comprising the spring pin secured to a coaxial structure.

FIG. 4 illustrates a perspective view of an apparatus 400 comprising the spring pin 100 secured to a coaxial structure. The apparatus 400 includes the coaxial pin 328 encased by the spring pin 100. The outer surface of the coaxial pin 328 physically contacts the inner surface of the cylindrical wall of the coaxial pin 100. This enables the coaxial pin 328 to electrically communicate with the spring pin 100 and thereby enables the coaxial pin 328 to electrically communicate with the printed circuit board (324, not pictured in FIG. 4) by way of the compliant fingers 106 of the spring pin 100.

As shown in FIG. 4, the coaxial structure itself may include a hard stop mechanism for preventing the spring pin 100 from sliding up the coaxial pin 328. In the example illustrated in FIG. 4, the coaxial pin 328 casing includes a hard stop 402 that extends outward and prevents the spring pin 100 from continuing to slide up the coaxial structure. This ensures the spring pin 100 remains in its desired position and can continue to contact the circuit board. The hard stop 402 extension extends outward from the coaxial pin 328 at least a distance sufficient to prevent the spring pin 100 from sliding up the coaxial pin 328. It should be understood that the hard stop 402 may include any ridge or blockade capable of preventing the spring pin 100 from sliding upward and away from the circuit board.

Figure 5:
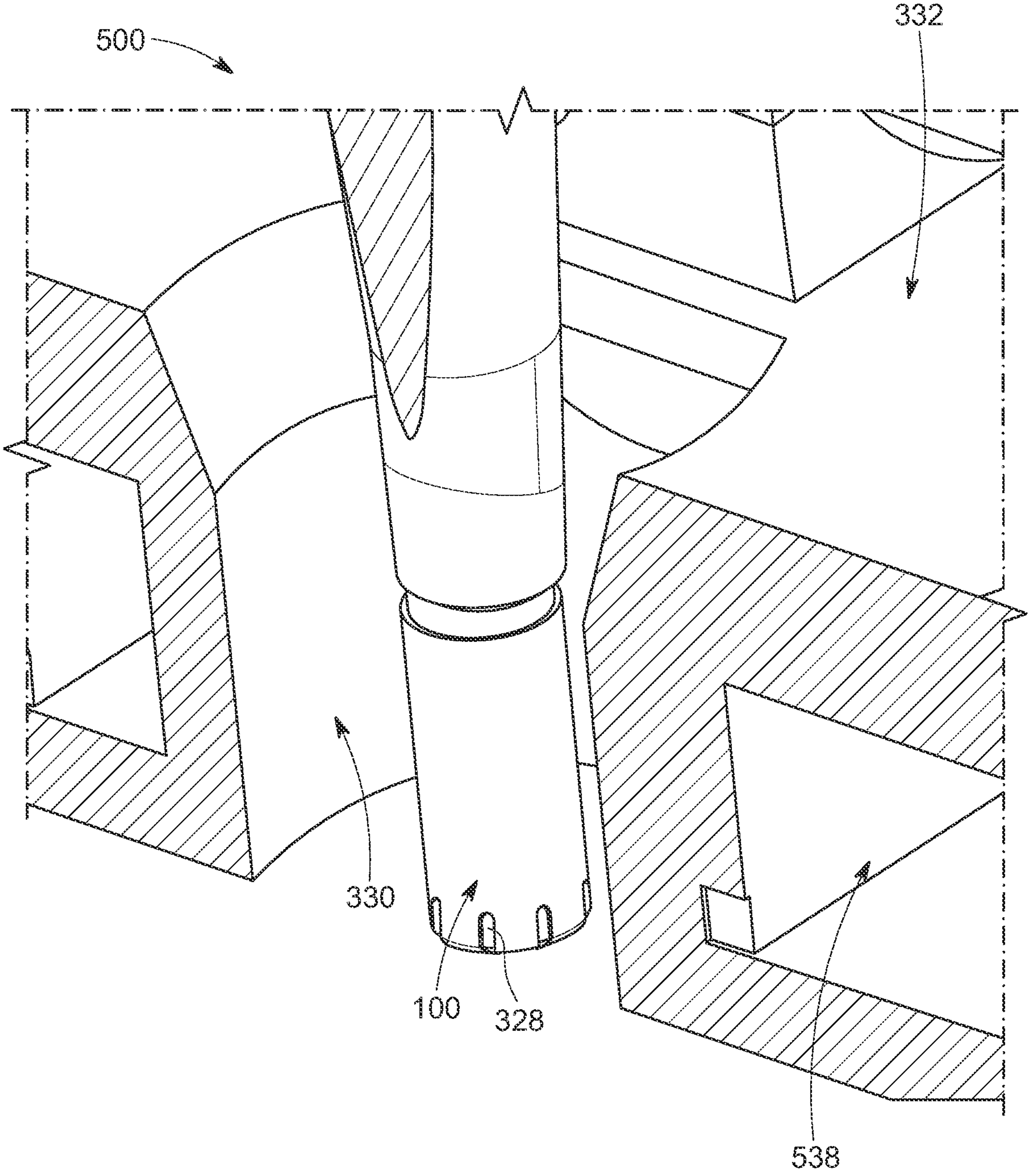
FIG. 5 illustrates a perspective view of a system comprising the spring pin secured to a coaxial structure.

FIG. 5 illustrates a perspective view of a system 500 comprising the spring pin 100 secured to a coaxial structure. As discussed in connection with other figures shown herein, the spring pin 100 forms a sleeve around the coaxial pin 328 and thereby enables the coaxial pin 328 to electrically communicate with a printed circuit board. The spring pin 100 significantly reduces manufacturing cost for the system 500 and provides a low cost means for ensuring reliable electromagnetic communication between an antenna array and a printed circuit board.

The system 500 includes components of an antenna array configured to propagate an electromagnetic signal. The antenna array includes the coaxial air pocket 330 surrounding the coaxial pin 328 and the spring pin 100. The coaxial air pocket 330 extends in the positive Z-axis direction relative to the spring pin 100 and meets the air space 332 of the antenna array. The antenna array includes one or more pockets 538, which include an air space formed by a hollow metal structure. The metal structures of the pockets 538 are optimized for weight reduction of the printed array.

Figure 6:
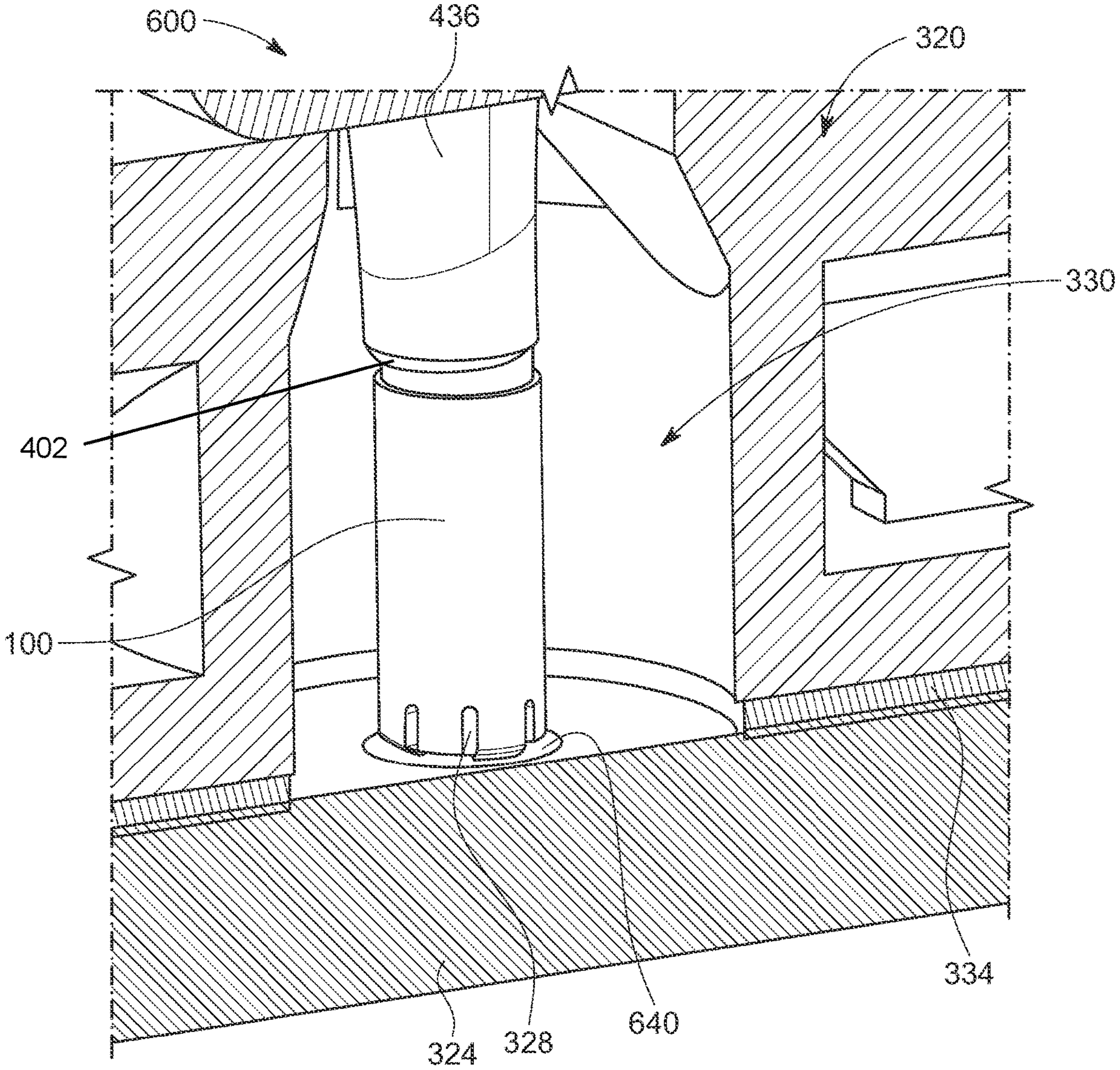
FIG. 6 illustrates a perspective view of a system comprising the spring pin communicating with a printed circuit board.

FIG. 6 illustrates a perspective view of a system 600 comprising the spring pin 100 communicating with a printed circuit board 324. FIG. 6 illustrates a further view of how the spring pin 100 may integrate within a broader system comprising an antenna array 320 with a coaxial structure. The system 600 includes a conductive compliant interposer 334 disposed between the printed circuit board 324 and metal structures of the antenna array 320. As shown in FIG. 3, the conductive compliant interposer 334 may be shaped to contact only the metal structures of the antenna array 320, and not the negative air space of the antenna array 320, such as the coaxial air pocket 330 disposed around the spring pin 100 and coaxial pin 328.

The compliant fingers 106 of the spring pin 100 (not shown in FIG. 6) physically contact a conductive element 640 of the printed circuit board 324. This enables the antenna array 320 to receive signals from the printed circuit board 324 and provide signals to the printed circuit board 324. The spring pin 100 provides a reliable means for ensuring the electromagnetic communication between the antenna array 320 and the printed circuit board 324 is not disrupted during use.

Figure 7:
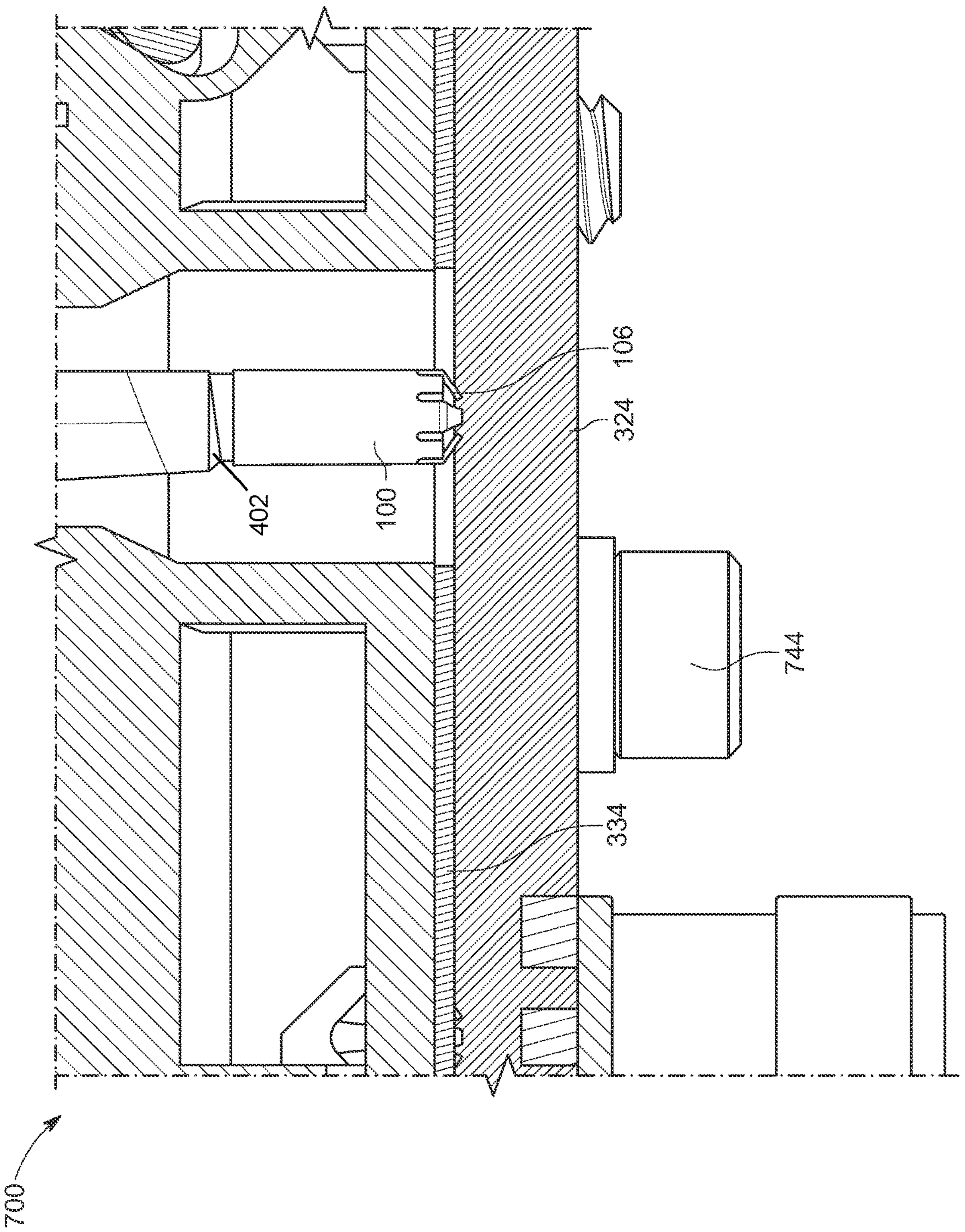
FIG. 7 illustrates a straight-on side view of a system comprising the spring pin communicating with a printed circuit board.

FIG. 7 illustrates a straight-on side view of a system 700 comprising the spring pin 100 communicating with a printed circuit board. As shown in FIG. 7, the compliant fingers 106 of the spring pin 100 bridge the gap between the coaxial pin 328 and the printed circuit board 324. The spring pin 100 provides a reliable means to ensure the coaxial pin 328 makes electrical contact with the conductive element 640 (not pictured in FIG. 7) of the printed circuit board 324. This accounts for variations in bow, warp, twist, and thickness of the printed circuit board 324 that may alter the distance between the top surface of the printed circuit board 324 and the bottom surface of the antenna array 320.

The system 700 may further include mounting screws 744 for the purpose of providing a compressive force between the printed circuit board 324 and the metal array 320. The compressive force provided by the mounting screws 744 compresses the conductive interposer 334 and the compliant fingers 106. This enables an ideal coaxial structure for communication between the printed circuit board 324 and the antenna array.

Examples

The following examples pertain to further embodiments.

Example 1 is a system. The system includes a coaxial structure comprising a coaxial pin. The system includes a spring pin configured to be disposed around the coaxial pin. The system includes a printed circuit board comprising an electrically conductive pad.

Example 2 is a system as in Example 1, wherein the spring pin comprises a hollow casing and a plurality of compliant fingers disposed at one end of the hollowing casing.

Example 3 is a system as in any of Examples 1-2, wherein the plurality of compliant fingers and configured to bend inward toward a center point defined by the hollow casing.

Example 4 is a system as in any of Examples 1-3, wherein the spring pin comprises four compliant fingers.

Example 5 is a system as in any of Examples 1-4, wherein the spring pin is manufactured of an electrically conductive material comprising bending properties.

Example 6 is a system as in any of Examples 1-5, wherein the spring pin is manufactured using metal stamping manufacturing techniques.

Example 7 is a system as in any of Examples 1-6, further comprising an antenna array, wherein the coaxial pin is a component of the antenna array.

Example 8 is a system as in any of Examples 1-7, wherein the antenna array is manufactured using metal additive manufacturing techniques such that the antenna array comprises a single indivisible metal element.

Example 9 is a system as in any of Examples 1-8, wherein the antenna array comprises a plurality of radiating elements for receiving and/or transmitting electromagnetic signals.

Example 10 is a system as in any of Examples 1-9, wherein the coaxial pin facilitates electromagnetic communications between a radiating element of the antenna array and the printed circuit board.

Example 11 is a system as in any of Examples 1-10, wherein the spring pin comprises a plurality of compliant fingers for forming a blind-mate connection between the coaxial pin and the electrically conductive pad of the printed circuit board.

Example 12 is a system as in any of Examples 1-11, wherein the spring pin comprises a hollow cylindrical configuration such that the spring pin is disposed around an exterior surface of the coaxial pin.

Example 13 is a system as in any of Examples 1-12, wherein the spring pin is slid into the antenna array around the exterior surface of the coaxial pin, and wherein the spring pin is not soldered to the antenna array.

Example 14 is a system as in any of Examples 1-13, wherein the spring pin comprises a plurality of compliant fingers, and wherein each of the plurality of compliant fingers forms a blind-mate connection to the electrically conductive pad of the printed circuit board.

Example 15 is a system as in any of Examples 1-14, wherein the spring pin is disposed around an exterior surface of the coaxial pin, and wherein an exterior surface of the spring pin is adjacent to an air space disposed within the antenna array.

Example 16 is a system as in any of Examples 1-15, and wherein the spring pin is adjacent to the air space disposed within the antenna array, and wherein the air space comprises a dielectric material.

Example 17 is a system as in any of Examples 1-16, wherein the circuit card assembly comprises a printed circuit board and one or more chips for providing instructions or signals to the antenna array.

Example 18 is a system as in any of Examples 1-17, wherein the antenna array is a phased array.

Example 19 is a system as in any of Examples 1-18, wherein the antenna array is a passive array.

Example 20 is a system as in any of Examples 1-19, further comprising a conductive compliant interposer disposed between the printed circuit board and the ground plane of the array.

Example 21 is a system. The system includes a circuit board comprising an electrically conductive pad. The system includes a coaxial pin. The system includes a spring pin configured to be disposed around at least a portion of the coaxial pin. The spring pin enables the coaxial pin to maintain an electrical connection with the electrically conductive pad of the circuit board.

Example 22 is a system as in Example 21, further comprising an antenna array, wherein the coaxial pin is a component of the antenna array; and wherein the coaxial pin enables an electromagnetic wave to propagate between the coaxial pin and an outer ground of the antenna array. In an implementation, the electromagnetic wave undergoes a phase shift relative to a neighboring coaxial pin in the antenna array that steers the propagated electromagnetic wave without any physical movement.

Example 23 is a system as in any of Examples 21-22, wherein the spring pin comprises a hollow casing configured to envelop at least a portion of an exterior surface of the coaxial pin; and wherein an end of the hollow casing comprises one or more compliant fingers.

Example 24 is a system as in any of Examples 21-23, wherein each of the one or more compliant fingers is configured to bend inward toward a centerline of the coaxial pin when the coaxial pin is depressed against the circuit board; and wherein each of the one or more compliant fingers is electrically conductive.

Example 25 is a system as in any of Examples 21-24, wherein the spring pin is manufactured using metal stamping manufacturing techniques.

Example 26 is a system as in any of Examples 21-25, wherein the spring pin is manufactured using metal additive manufacturing techniques.

Example 27 is a system as in any of Examples 21-26, wherein the coaxial pin comprises a cylindrical geometry having a first diameter; wherein the spring pin comprises a cylindrical geometry having a second diameter; wherein the second diameter is longer than the first diameter; and wherein a dimension of the second diameter is optimized to enable the spring pin to form an electrical connection with an exterior surface of the coaxial pin.

Example 28 is a system as in any of Examples 21-27, further comprising an antenna array; wherein the coaxial pin is a component of the antenna array; wherein each of the coaxial pin and the antenna array is manufactured as a single element using metal additive manufacturing techniques; and wherein the spring pin is manufactured separately from the coaxial pin and the antenna array.

Example 29 is a system as in any of Examples 21-28, further comprising an antenna array, wherein the coaxial pin facilitates electromagnetic communications between the circuit board and a radiating element of the antenna array.

Example 30 is a system as in any of Examples 21-29, wherein the spring pin comprises a plurality of compliant fingers configured to form a blind-mate connection between the coaxial pin and the electrically conductive pad of the circuit board.

Example 31 is a system as in any of Examples 21-30, wherein the spring pin comprises a hollow cylindrical geometry such that the spring pin is slid around an exterior surface of the coaxial pin, and wherein the spring pin is not soldered to the coaxial pin or the circuit board.

Example 32 is a system as in any of Examples 21-31, further comprising an antenna array; wherein the spring pin is disposed around an exterior surface of the coaxial pin; and wherein an exterior surface of the spring pin is disposed adjacent to an air space defined by the antenna array.

Example 33 is a system as in any of Examples 21-32, wherein the airspace comprises a dielectric material.

Example 34 is a system as in any of Examples 21-33, further comprising a conductive compliant interposer disposed between the circuit board and a ground plane of the antenna array.

Example 35 is a system as in any of Examples 21-34, wherein one or more of the coaxial pin or the spring pin directly contacts the electrically conductive pad of the circuit board such that the circuit board does not comprise the conductive compliant interposer at the electrically conductive pad.

Example 36 is a system as in any of Examples 21-35, further comprising a circuit card assembly, wherein the circuit card assembly comprises the circuit board and further comprises one or more chips for providing instructions or signals to an antenna array.

Example 37 is a system as in any of Examples 21-36, wherein the antenna array is a phased array.

Example 38 is a system as in any of Examples 21-37, wherein the antenna array is a passive array.

Example 39 is a system as in any of Examples 21-38, wherein the spring pin is manufactured using metal stamping manufacturing techniques; wherein the spring pin is bent to form a cylindrical geometry optimized for encasing a length of the coaxial pin; and wherein the spring pin comprises an opening disposed along a length of the spring pin.

Example 40 is a system as in any of Examples 21-39, wherein the spring pin is compliant such that at least a portion of the spring pin is configured to bend when the spring pin is depressed against the circuit board.

Example 41 is a system as in any of Examples 21-40, further comprising an antenna array, wherein the coaxial pin is a component of the antenna array.

Example 42 is a system as in any of Examples 21-41, further comprising an antenna array, wherein the spring pin facilitates propagation of an electromagnetic wave between the antenna array and the circuit board by way of the coaxial pin.

Example 43 is a system as in any of Examples 21-42, wherein the coaxial pin facilitates propagation of an electromagnetic wave between the circuit board and a radiating element of an antenna array.

Example 44 is a system as in any of Examples 21-43, wherein the spring pin is disposed around an exterior surface of the coaxial pin, and wherein an exterior surface of the spring pin is disposed adjacent to a dielectric material disposed within the antenna array.

Example 45 is a system as in any of Examples 21-44, further comprising a conductive compliant interposer disposed between the circuit board and a ground plane of the antenna array, and wherein the conductive compliant interposer is not present in a region immediately adjacent to the spring pin and the coaxial pin.

Example 46 is a system as in any of Examples 21-45, wherein the coaxial pin comprises a hard stop extending outward relative to a centerline of the coaxial pin, and wherein the hard stop is configured to prevent the spring pin from sliding upward along the coaxial pin in a direction leading away from the circuit board.

Example 47 is a system as in any of Examples 21-46, wherein the spring pin comprises: a cylindrical body configured to be disposed around at least a portion of the coaxial pin; and a plurality of compliant fingers; wherein at least one of the plurality of compliant fingers is bent inward toward a centerline defined by the cylindrical body to prevent the spring pin from sliding along the coaxial pin in a direct away from the circuit board.

Example 48 is a system as in any of Examples 21-47, wherein the at least one of the plurality of compliant fingers is bent to have an interior angle from about 70° to about 100°.

Example 49 is a system as in any of Examples 21-48, wherein each of the plurality of compliant fingers is bent to have an interior angle from about 70° to about 140°.

Example 50 is a system as in any of Examples 21-49, wherein at least one of the plurality of compliant fingers is bent to have a smaller interior angle than at least one other of the plurality of compliant fingers to prevent the spring pin from sliding up the coaxial pin in a direction leading away from the circuit board.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A system comprising:

a circuit board comprising an electrically conductive pad;

a coaxial pin; and a spring pin configured to be disposed around at least a portion of the coaxial pin;

wherein the spring pin enables the coaxial pin to maintain an electrical connection with the electrically conductive pad of the circuit board.

2. The system of claim 1, further comprising an antenna array, wherein the coaxial pin is a component of the antenna array.

3. The system of claim 2, wherein the spring pin is disposed around an exterior surface of the coaxial pin; and wherein an exterior surface of the spring pin is disposed adjacent to an air space defined by the antenna array.

4. The system of claim 2, wherein the spring pin is disposed around an exterior surface of the coaxial pin; and wherein an exterior surface of the spring pin is disposed adjacent to a dielectric material disposed within the antenna array.

5. The system of claim 2, further comprising a conductive compliant interposer disposed between the circuit board and a ground plane of the antenna array.

6. The system of claim 1, wherein the spring pin comprises a hollow casing configured to envelop at least a portion of an exterior surface of the coaxial pin; and wherein an end of the hollow casing comprises one or more compliant fingers.

7. The system of claim 6, wherein each of the one or more compliant fingers is configured to bend inward toward a centerline of the coaxial pin when the coaxial pin is depressed against the circuit board; and wherein each of the one or more compliant fingers is electrically conductive.

8. The system of claim 1, wherein the spring pin is manufactured using metal stamping manufacturing techniques.

9. The system of claim 1, wherein the spring pin is manufactured using metal additive manufacturing techniques.

10. The system of claim 1, wherein the coaxial pin comprises a cylindrical geometry having a first diameter;

wherein the spring pin comprises a cylindrical geometry having a second diameter;

wherein the second diameter is longer than the first diameter; and wherein a dimension of the second diameter is optimized to enable the spring pin to form an electrical connection with an exterior surface of the coaxial pin.

11. The system of claim 1, further comprising an antenna array;

wherein the coaxial pin is a component of the antenna array;

wherein each of the coaxial pin and the antenna array is manufactured as a single element using metal additive manufacturing techniques; and wherein the spring pin is manufactured separately from the coaxial pin and the antenna array.

12. The system of claim 1, further comprising an antenna array, wherein the coaxial pin facilitates propagation of an electromagnetic wave between the circuit board and a radiating element of the antenna array.

13. The system of claim 1, wherein the spring pin comprises a plurality of compliant fingers configured to form a blind-mate connection between the coaxial pin and the electrically conductive pad of the circuit board.

14. The system of claim 1, wherein the spring pin comprises a hollow cylindrical geometry such that the spring pin is slid around an exterior surface of the coaxial pin, and wherein the spring pin is not soldered to the coaxial pin or the circuit board.

15. The system of claim 1, further comprising a circuit card assembly, wherein the circuit card assembly comprises the circuit board and further comprises one or more chips for providing instructions or signals to an antenna array.

16. The system of claim 15, wherein the antenna array is a phased array or a passive array.

17. The system of claim 1, wherein the coaxial pin comprises a hard stop extending outward relative to a centerline of the coaxial pin, and wherein the hard stop is configured to prevent the spring pin from sliding upward along the coaxial pin in a direction leading away from the circuit board.

18. The system of claim 1, wherein the spring pin is manufactured using metal stamping manufacturing techniques;

wherein the spring pin is bent to form a cylindrical geometry optimized for encasing a length of the coaxial pin; and wherein the spring pin comprises an opening disposed along a length of the spring pin.

19. The system of claim 1, wherein the spring pin is compliant such that at least a portion of the spring pin is configured to bend when the spring pin is depressed against the circuit board.

20. The system of claim 1, wherein the spring pin comprises:

a cylindrical body configured to be disposed around at least the portion of the coaxial pin; and a plurality of compliant fingers;

wherein at least one of the plurality of compliant fingers is bent inward toward a centerline defined by the cylindrical body to prevent the spring pin from sliding along the coaxial pin.

* * * * *